United States Patent
Kjaergaard et al.

(10) Patent No.: US 9,194,364 B2
(45) Date of Patent: Nov. 24, 2015

(54) DIRECT DRIVE WIND TURBINE, TRANSPORT SYSTEM AND METHOD OF CONSTRUCTION OF A DIRECT DRIVE WIND TURBINE

(75) Inventors: Finn Kjaergaard, Ry (DK); Jesper Munch, Vejle (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 613 days.

(21) Appl. No.: 13/636,739

(22) PCT Filed: Mar. 10, 2011

(86) PCT No.: PCT/EP2011/053641
§ 371 (c)(1),
(2), (4) Date: Nov. 26, 2012

(87) PCT Pub. No.: WO2011/117080
PCT Pub. Date: Sep. 29, 2011

(65) Prior Publication Data
US 2013/0136585 A1    May 30, 2013

(30) Foreign Application Priority Data
Mar. 26, 2010    (EP) .................................... 10157898

(51) Int. Cl.
F03D 11/00 (2006.01)
F03D 1/06 (2006.01)
F03D 7/02 (2006.01)
F03D 11/02 (2006.01)

(52) U.S. Cl.
CPC ................ *F03D 1/06* (2013.01); *F03D 1/0691* (2013.01); *F03D 7/0224* (2013.01); *F03D 11/00* (2013.01); *F03D 11/028* (2013.01); *F05B 2260/406* (2013.01); *F05B 2260/60* (2013.01); *F05B 2260/79* (2013.01); *F16C 2360/31* (2013.01); *Y02E 10/721* (2013.01); *Y02E 10/722* (2013.01); *Y02E 10/723* (2013.01); *Y02E 10/726* (2013.01)

(58) Field of Classification Search
CPC . F03D 1/0691; F03D 7/0224; F03D 11/0008; F05D 2260/76; F05D 2260/98; F16L 27/0808; B64C 11/38; B64C 11/40
USPC ........................................................ 416/157 R
See application file for complete search history.

(56) References Cited

U.S. PATENT DOCUMENTS 7,418,820 B2 *   9/2008   Harvey et al. ................... 60/487
7,547,985 B2 *   6/2009   Takaichi et al. ................. 290/55
(Continued)

FOREIGN PATENT DOCUMENTS

CN    101473135 A    7/2009
CN    101918712 A    12/2010
(Continued)

*Primary Examiner* — Ninh H Nguyen

(57) ABSTRACT

A direct drive wind turbine with a nacelle and a rotor including a hub, the nacelle and the hub connected in an interface region. The wind turbine includes a transport system for transporting hydraulic and/or pneumatic fluid from the nacelle into the hub. The transport system includes a rotary unit through which the fluid passes. A part of the rotary unit rotates in operation together with the hub. The rotary unit is positioned in the hub at a position distanced from the interface region facing away from the nacelle. Further disclosed are a transport system and a method of construction of such a direct drive wind turbine.

8 Claims, 5 Drawing Sheets

(56) References Cited

U.S. PATENT DOCUMENTS

Figure 1:
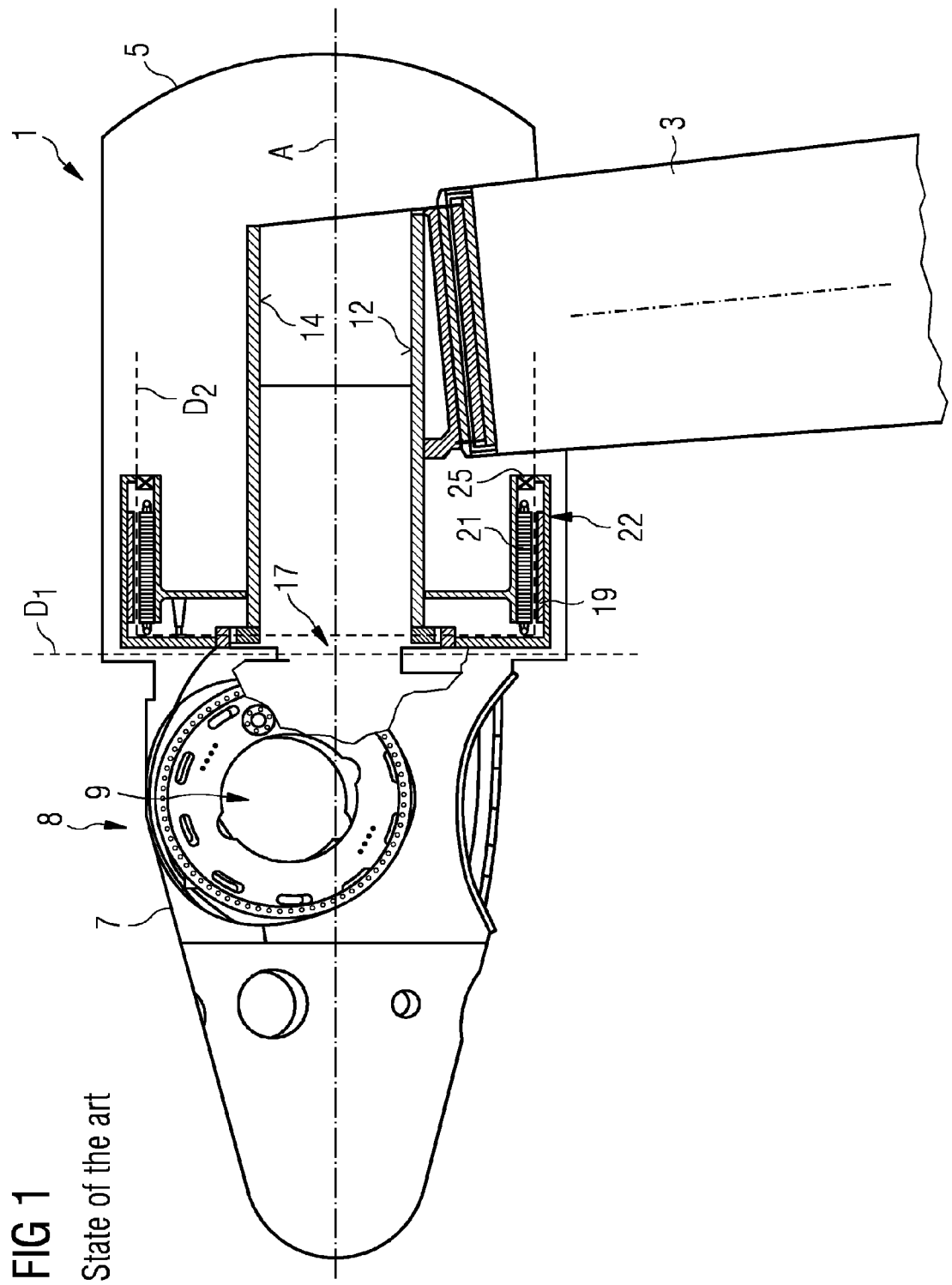

| | | | |
|---|---|---|---|
| 7,658,594 B2 * | 2/2010 | Christensen et al. | 416/157 A |
| 7,728,452 B2 * | 6/2010 | Arinaga et al. | 290/44 |
| 2010/0052325 A1 | 3/2010 | Holstein | |
| 2012/0263593 A1 * | 10/2012 | McCallum et al. | 416/147 |

FOREIGN PATENT DOCUMENTS

| | | |
|---|---|---|
| DE | 20317749 U1 | 3/2005 |
| GB | 2071779 A | 9/1981 |
| WO | WO 2008000882 A1 | 1/2008 |
| WO | WO 2009058022 A1 | 5/2009 |

\* cited by examiner

State of the art

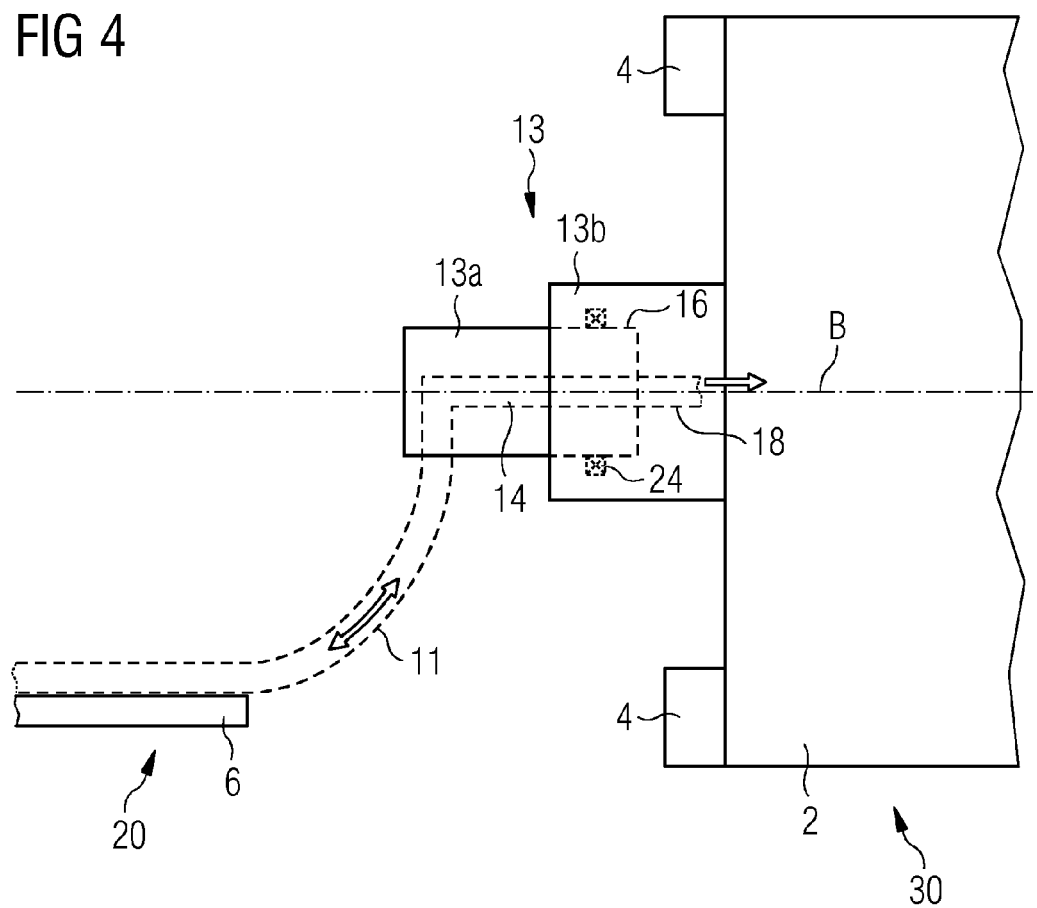

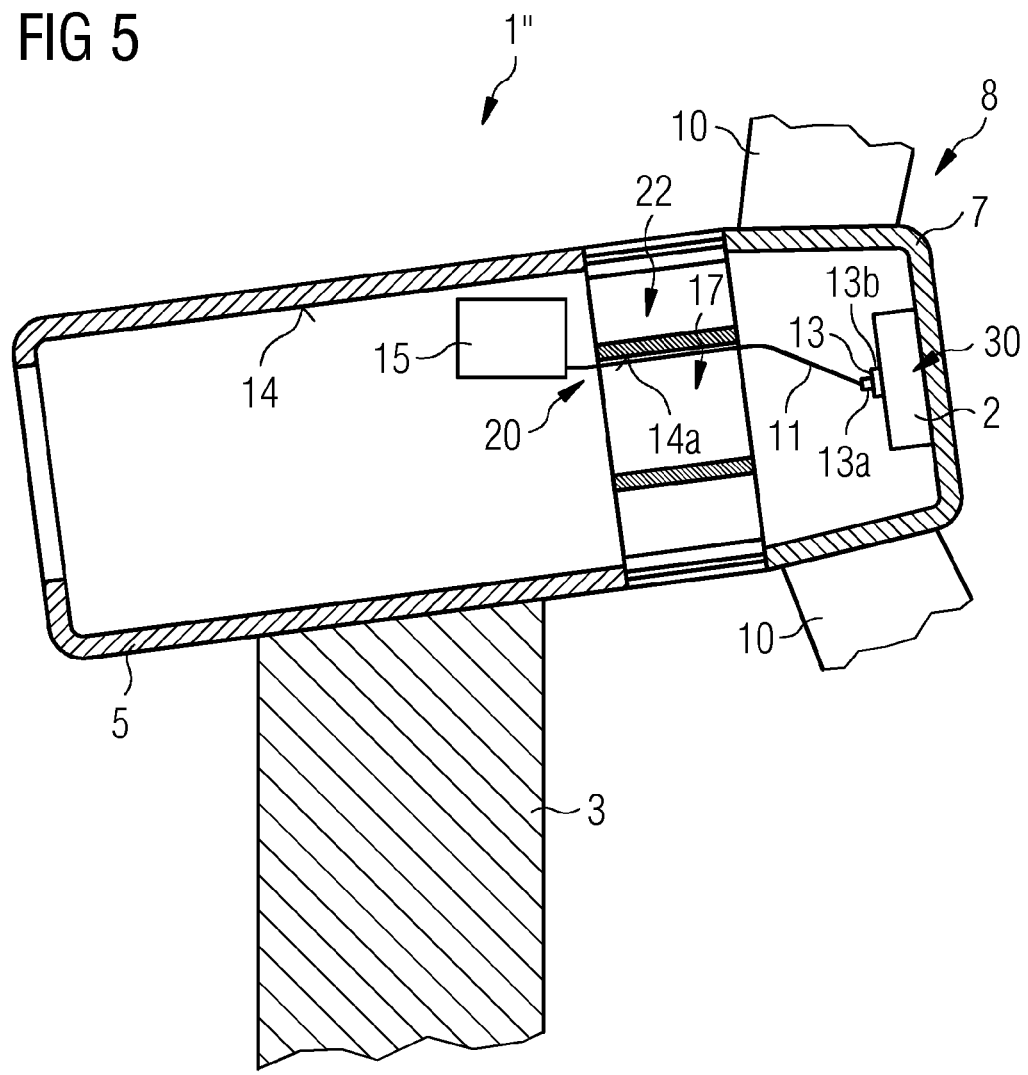

DIRECT DRIVE WIND TURBINE, TRANSPORT SYSTEM AND METHOD OF CONSTRUCTION OF A DIRECT DRIVE WIND TURBINE

CROSS REFERENCE TO RELATED APPLICATIONS

This application is the US National Stage of International Application No. PCT/EP2011/053641, filed Mar. 10, 2011 and claims the benefit thereof. The International Application claims the benefits of European application No. 10157898.7 EP filed Mar. 26, 2010. All of the applications are incorporated by reference herein in their entirety.

FIELD OF THE INVENTION

The invention relates to a direct drive wind turbine with a nacelle and a rotor, the rotor comprising a number of blades and a hub, the nacelle and the hub being connected with each other in an interface region, the wind turbine further comprising a transport system for transporting hydraulic and/or pneumatic fluid from the nacelle into the hub. The invention also relates to a transport system and to a method of construction of such a wind turbine.

BACKGROUND OF THE INVENTION

Today's wind turbines, in particular large scale wind turbines with power outputs in the scale of above 1 MW, are very complex systems. Despite their large size, their operational state needs to be adaptable to current weather conditions, in particular wind conditions. For that purpose, the position of the rotor blades of the rotors of such wind turbines can be adapted. A so-called pitch control system allows for positioning the rotor blades against the wind by rotating the blades around their longitudinal axis. Thus, the rotational speed of the rotor can be controlled and a maximum power output can be achieved.

The usual way of pitch control of the rotor blades is by using an electric pitch control system in which electric engines control the pitch of the blades. However, it has been wished for to use hydraulic pitch systems (or pneumatic pitch systems—which are also summarized under the expression "hydraulic pitch system" in the context of this application) rather than electric ones. Such hydraulic systems are often easier to control and they also still function in the case of an interruption of power output of the generator of the wind turbine because they are not directly dependent on electric power supply by the wind turbine itself. In order to drive such hydraulic pitch systems it is necessary to have a transport system which transports a hydraulic and/or pneumatic fluid (such as hydraulic oil, water or any other liquid or gas) into the pitch control system in the hub under a certain pressure. In other words, the hydraulic and/or pneumatic fluid is put under a certain pressure by means of a pump and lead to a distribution block, to blade blocks and accumulator blocks which are all located inside the hub in close proximity to the rotor blades.

The transport of this pressurised hydraulic and/or pneumatic fluid, however, has proven to be quite complicated. This is due to the fact that the hub rotates in operation of the wind turbine so that a solution has to be found of how the pipes of the transport system are not rotated together with the hub in such a way that they will be damaged due to torsions.

This problem is even increased if the wind turbine is realized as a direct drive wind turbine with a drive train directly connecting the rotor with a generator. The drive train then comprises those parts which project from the hub into the nacelle and which are essentially formed pipe-like. Therefore, such drive train in a direct drive wind turbine can also be characterized as a communication link or communication assembly in contrast to drive trains in an indirect drive wind turbine (where the drive train comprises a number of shafts). Such direct connection between the rotor and the generator means that no gearbox which could be used to transfer the (rather slow) rotation of the rotor into a faster rotation of a shaft. Rather, the rotation of the rotor of the wind turbine is directly transferred into the generation of electric energy.

Whereas it is possible to lead pipes of a transport system for hydraulic and/or pneumatic fluids through the drive train, i.e. a shaft, of an indirect-drive wind turbine with a gearbox, such shaft does not exist in direct drive wind turbines. Therefore, the problem of transferring the hydraulic and/or pneumatic fluid from the nacelle into the hub is particularly difficult to solve in the case of direct drive wind turbines.

SUMMARY OF THE INVENTION

It is therefore an object of the invention to provide a possibility of supplying and/or operating a direct drive wind turbine with an enhanced transport system for transporting hydraulic or pneumatic fluid from the nacelle into the hub of the wind turbine. One particular object of the invention is also to provide such a transport system which poses a minimum obstacle to staff who want to enter the hub from the nacelle for purpose of maintenance and/or assembly of the direct drive wind turbine.

The objects of the invention are achieved by the claimed wind turbine, transport system and method. Article 1.

Accordingly, a direct drive wind turbine of the abovementioned kind is realized such that the transport system comprises a rotary unit (or rotary union) as a connection through which the fluid passes and a part of which rotates in operation together with the hub which rotary unit is positioned in the hub at a position distanced from the interface region facing away from the nacelle.

Rotary units can be characterized as construction elements of a transport system with a stationary (or non-rotatable) part and a rotatable (or non-stationary) part connected to each other in such way that the rotating part can rotate around a predefined rotation axis. The connection between the stationary part and the rotatable part is such that essentially no hydraulic and/or pneumatic fluid passes from the inside of the rotary unit to its outside, i.e. the inner side of the rotation unit is isolated such that it prevents a leakage. When fluid is led into the inside of the stationary part it will pass into the inside of the rotatable part and from there into other (stationary or non-stationary) parts of the transport system. The fluid can also be led into the rotatable part and pass into the stationary part. The fluid passes from the nacelle into the hub, but it can possibly also be led back into the opposite direction if needed. For instance, a pump situated in the nacelle can pump the fluid via the rotary unit into a hydraulic pitch system in the hub. The fluid may also be led back into the nacelle, for example into a reservoir in the nacelle.

The invention makes use of such a rotary unit which is specifically positioned in the hub at a position distanced from the interface region facing away from the nacelle. Such an interface region is situated at the inside of the wind turbine as a transition area in which both the nacelle and the hub end and which can thus be assigned either to the nacelle or to the hub, but not clearly to any of both. The nacelle forms a first cavity, the space surrounded by the direct drive generator forms a second cavity and the hub forms a third cavity. The interface region is located where the second cavity is connected to the third cavity. The interface region is normally used in order to get from the nacelle into the hub which implies that an average sized adult man can travel through the cavities. No main functional elements of the wind turbine are situated in the cavities in the interface region. Such functional parts are in particular the rotor, the pitch system, or the generator. The generator is assembled around the interface region, i.e. not in the interface region itself, but surrounding it. Generally, the interface region can be derived from the outside limits of the nacelle facing in the direction of the hub. The outside limits of the nacelle are best defined by the limits of its outer shell, the so-called canopy. These limits define a plane extending through the inside of the wind turbine. From this plane to either side into the nacelle and into the hub the interface region extends not more than 0.3 meters.

In other words, the rotary unit is positioned inside of the hub, i.e. away from the nacelle on the other side of the interface region. Due to this positioning the rotary unit does not stand in the way of operations either within the nacelle or in the interface region through which staff want to pass without being hindered by any objects such as the rotary unit.

Such positioning also has the advantage that the stationary part of the rotary unit is connected to the nacelle whereas the rotatable part of the rotary unit can be directly connected to the hub, in particular to the pitch system within the hub. Thus the stationary part of the wind turbine, i. e. the nacelle, is connected to the stationary part of the rotary unit, whereas the rotatable part of the wind turbine, i. e. the hub, is connected to the rotatable part of the rotary unit. The functions of the parts of the rotary unit match with the functions of the nacelle and of the hub respectively. Positioning the rotary unit in the hub means that it is placed at the very location in which the hydraulic fluid is needed, i.e. as close as possible to the pitch system. It is for that reason that staff working in the inside of the wind turbine can freely pass into the hub without being hindered by a rotary unit. This is particularly so in a direct drive wind turbine: and from the rotating hub some parts project into the nacelle. These parts carry a rotor of a generator which is surrounded by (or which surrounds) stator coils of this generator. This stator is carried by the nacelle. Thus, the region of the interface between the hub and the nacelle is essentially hollow so that persons can pass from the nacelle into the hub easily. The drive train comprises those parts which project from the hub into the nacelle and which are essentially formed pipe-like. In the cavity formed by this pipe-like arrangement, a rotary unit could hinder staff from safely entering the hub or from returning back to the nacelle from the hub if the rotary unit is positioned in the interface region or further in the nacelle. The positioning of the rotary unit in the hub prevents such problems effectively.

The wind turbine according to the invention comprises a transport system. The invention therefore also concerns a transport system for such wind turbine comprising a rotary unit as a connection through which the fluid passes, a part of which rotary unit rotates in operation together with the hub which rotary unit is realized and/or positioned within the transport system such that it can be positioned in the hub at a position distanced from the interface region facing away from the nacelle. Such transport system can be used in order to re-equip existing wind turbines in order to produce a wind turbine according to the invention. The realization and/or positioning of the wind turbine is carried out such that in dependence of the wind turbine which is to be equipped, the rotary unit is assembled along the transport system at such a distance that permits that it can be installed close to the pitch system and within the hub.

For instance, if the transport system comprises a pipe system which is to extend from the nacelle into the hub, such pipe system will have a length permitting to go beyond the interface region into the hub and will then end in the rotary unit which can thus be positioned somewhere in the hub, preferably directly connectable to a pitch system in the hub. In other words, the way from the nacelle, for instance from a reservoir and/or pump positioned in the nacelle, has to be bridged by a pipe system which is dimensioned as long to extend to reach the hub. There, the rotary unit is connected to the pipe system.

A method of construction of a direct drive wind turbine according to the invention includes the step of equipping the transport system with a rotary unit as a connection through which the fluid passes a part of which rotary unit rotates in operation together with the hub the rotary unit being positioned in the hub at a position distanced from the interface region facing away from the nacelle.

Particularly advantageous embodiments and features of the invention are given by the dependent claims, as revealed in the following description. Thereby, features revealed in the context of the wind turbine and/or the transport system may also be realized in the context of any of the methods according to the invention and vice versa.

As outlined above, it is particularly advantageous if the rotary unit is directly connected to a hydraulic and/or pneumatic pitch system in the hub. That means that the pitch system for which the fluid is supplied is directly fed with that fluid by the rotary unit without any intermediate pipe or other elements of a transport system. The shortest and safest way possible to transport the fluid from the rotary unit into the pitch system is thus realized.

Preferably the direct drive wind turbine further comprises a pump situated in the nacelle which pump in operation provides for pressure of the fluid in the transport system. That implies that the pump which provides for sufficient pressure within the transport system is situated remotely from the hub, i.e. remote from the pitch system in the first cavity of the wind turbine. The pump is thus situated in that part of the wind turbine, i.e. the nacelle, in which several functional parts of a similar kind as the pump itself would be positioned anyway. Such functional parts include control systems of the wind turbine or other parts which are integrated in housings and which are positioned in those spaces within the wind turbine where they can easily be maintained by staff without the need to enter the hub.

In contrast, positioning a pump in the hub itself would mean that the pump either stands in the way of operations in the hub or that it is connected to a part of the hub in such way that it will rotate together with the hub. That would mean that the power supply for the pump becomes very difficult. If one positioned the pump in the interface region that would mean that it Constitutes an obstacle for staff to enter the hub or to return from the hub into the nacelle. To sum up, positioning the pump and possibly a reservoir for the fluid inside of the nacelle is—under the given circumstances of the rotary unit being placed in the hub—a very good solution of how to operate the pump easily while not hindering staff at the same time.

In order to position the transport system within the hub it is very preferred that it comprises a pipe system leading from the interface region into the hub to the rotary unit, which pipe system is essentially fixed in its position within the hub so that it is not rotated during operation of the rotary unit. Such fixing of the pipe system in this position means that the pipe system itself will not be rotated during the operation of the rotary unit, i.e. with the rotation of the hub. Fixing the pipe system in such a stationary way means that it needs to be fixed to a non-rotating part of the wind turbine, preferably to the nacelle.

Such a fixing of the pipe system in its position within the hub can for instance be realized by a solid, rigid, non-flexible pipe which is affixed to an inside surface or another fixed element placed within the nacelle. The pipe then projects from the nacelle into the hub and is preferably stable enough to keep its position within the hub without any stabilizing elements. It is preferred, however, that the pipe system is fixed within the hub by means of a rail projecting from the nacelle into the hub. Such a rail is made of solid material with a sufficient stability to keep the pipe of the pipe system in its position during operation of a rotating hub. The pipe(s) of the pipe system is/are connected to this rail and thus led by the rail into the hub. The rail can protrude as far into the hub as to bridge the distance between the end of the nacelle, i.e. the interface region, and the hydraulic pitch system in the hub, for instance in the middle of the hub. The pipe is first guided along the rail and then can be led through free air to the rotary unit to which it is connected.

In such a case, the transport system may comprise pipes made of any material. Inflexible pipes such as metal pipes or pipes made of solid plastics may be used in particular in all those regions of the transport system which need to be protected from persons stepping onto them and/or from objects that might potentially injure them during operation or maintenance of the wind turbine. However, the transport system may also comprise a flexible pipe (or hose) if a rail is used.

In a particularly preferred embodiment the rail extends from the nacelle to the rotary unit. This means that the rail goes right from the nacelle up to the rotary unit so that the pipe is supported along its entire way from the interface region to the rotary unit by the rail.

The rail can be realized as a straight rail with no curves, but it may also have a shape describing a turn of direction. For instance, the rail may be straight from the nacelle into the hub and then extend in a different direction within the hub, i.e. towards the pitch system. The rail can be made of any solid material allowing for sufficient stability to keep its position and shape during operation of the wind turbine, i.e. during rotation of the hub. For instance a metal rail or a rail made of solid plastics can be utilized.

Preferably the rail is equipped with a cavity in which a pipe of the pipe system is positioned. Such cavity can be realized by using a tubular or partly tubular, i.e. cylindrical or partly cylindrical rail. A cavity can however also be realized by a rail having for instance an open cross-sectional shape (at least in parts along its longitudinal extension) such as a U-shape or a V-shape. In other words, the rail has a cross-sectional shape inside of which a pipe of the pipe system can be accommodated without an obvious necessity to further fixing the pipe to the rail. Another way of how to lead the pipe along the rail is to fix the pipe at least locally along its longitudinal extension to the rail, for instance by means of brackets and/or by means of adhesion.

In order to provide for a particularly stable and obstacle-free arrangement of the transport system within the wind turbine the rail can be fixed to the nacelle in such way that in the interface region it is situated closely to an inner surface of the wind turbine. For instance, the rail can be fixed to a ceiling surface or to a floor surface or to a side wall of the nacelle in the region of the interface region so that staff wishing to pass from the nacelle into the hub will not be hindered by an obstacle posed by the rail itself.

As for the rotary unit, it is particularly advantageous to position its rotation axis at a rotation axis of a drive train connecting the rotor with a generator—or in other words of a rotation axis of the hub, i.e. of the rotor. Both rotation axes are thus the same so that the rotary unit does not need to rotate with a different orientation than the rotation movement of the rotor itself. That way it can be realized that the rotatable part of the rotary unit is rotated along the same rotation axis as the drive train whereas the stationary part can remain in its position all throughout the operation of the wind turbine. A particular advantageous way of how to realize this is to directly connect the rotary unit to the pitch system, which pitch system is then preferably positioned at the centre of rotation, i.e. the rotation axis of the rotor.

Other objects and features of the present invention will become apparent from the following detailed descriptions considered in conjunction with the accompanying drawings. It is to be understood, however, that the drawings are designed solely for the purposes of illustration and not as a definition of the limits of the invention.

Figure 2:
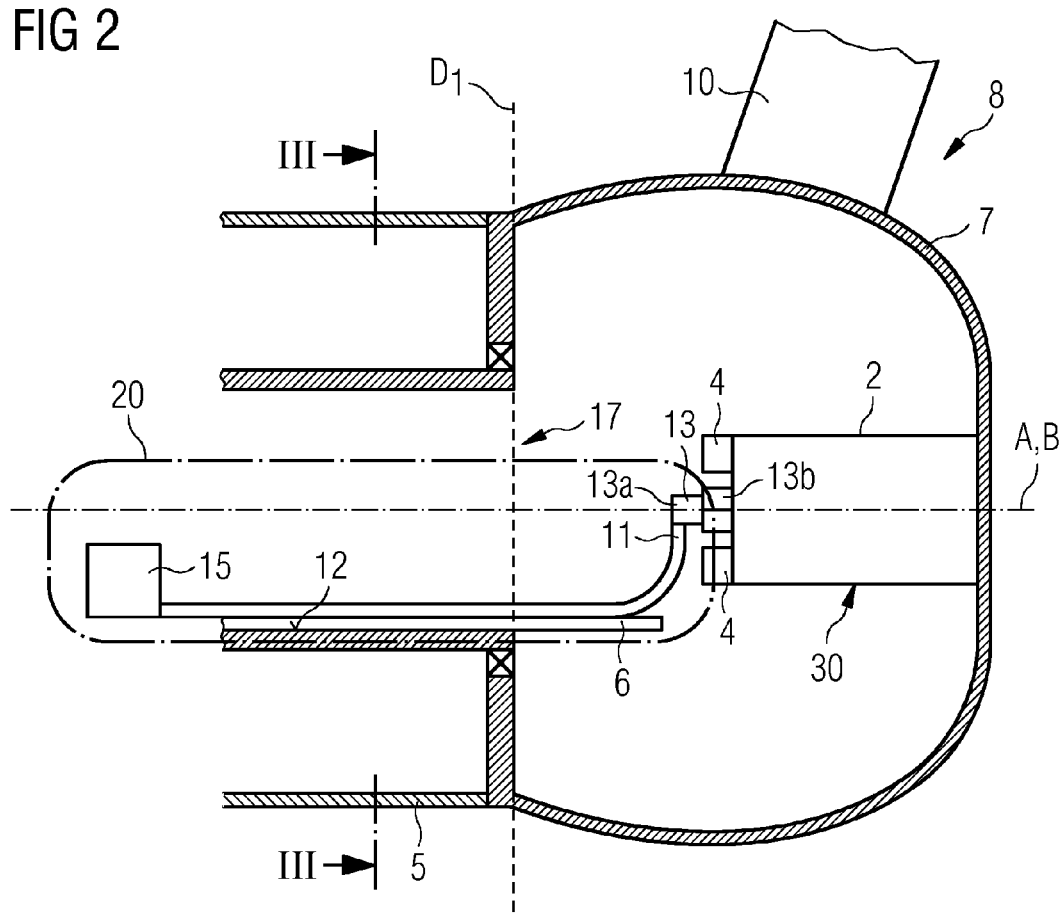
Figure 3:
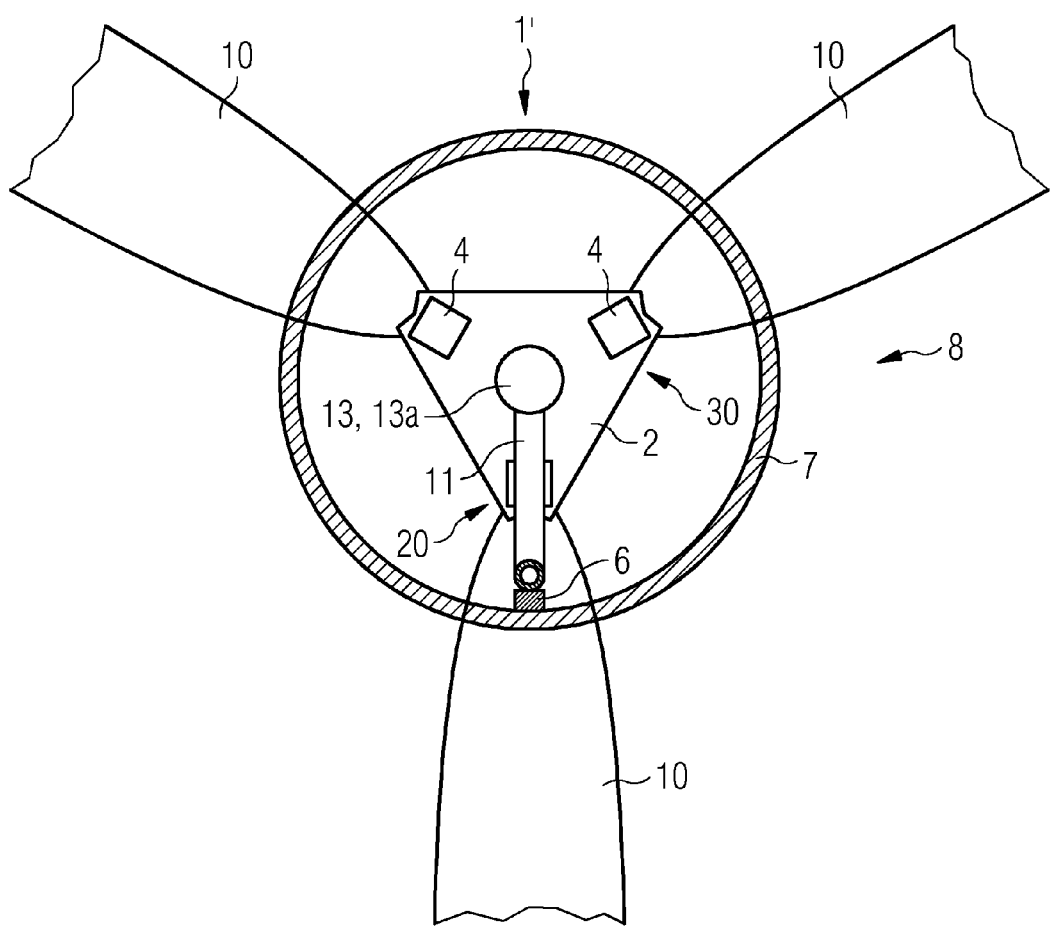

FIG. 1 shows partially sectional side view of a wind turbine according to the state of the art, FIG. 2 shows details of a first embodiment of a wind turbine according to the invention, FIG. 3 shows a view into the hub of the same wind turbine along line III-III in FIG. 2, FIG. 4 shows a side view of a rotary unit which can be used as an element of a transport system according to an embodiment of the invention, FIG. 5 shows a second embodiment of a wind turbine according to the invention.

In the drawings, like reference numbers refer to like objects throughout. Objects in the diagrams are not necessarily drawn to scale.

DETAILED DESCRIPTION OF THE INVENTION

FIG. 1 shows a wind turbine 1 with a nacelle 5 and a rotor 8. The rotor 8 comprises a hub 7 and rotor blades (not shown), which can be inserted into openings 9 within the hub 7. The nacelle 5 is positioned on top of a tower 3. At its inside it comprises inside surfaces 12, 14, i.e. a bottom floor 12 and a ceiling 14.

The wind turbine 1 is realized as a direct drive wind turbine 1 with a generator 22 which directly transfers the rotational energy of the rotation of the hub 7 into electrical energy. The generator 22 comprises a stator 21 and a generator rotor 19 which generator rotor 19 is moved rotatingly along bearings 25 relative to the stator 21 around a rotation axis A of the rotor 8. This rotation axis A therefore also constitutes the rotation axis A of a drive train which includes those parts of wind turbine 1 which project from the rotor 8 into the generator 22.

Due to the movement of the generator rotor 19 which is directly connected to the hub 7 electric current is induced in the windings of the stator 21 which electric current can then be transferred to users. Between the nacelle 5 and the hub 7 there is an interface region 17. This interface region 17 extends from a division line D1 which is defined by the outside limits of the nacelle 5 both into the nacelle 5 and into the hub 7 about 0.5 meters, in some cases less, for instance 0.2 meters (depending on the size of the wind turbine 1 in question). A strict definition of the interface region only includes the division line D1 itself in the inside of the wind turbine 1 as the interface region.

In wind turbines according to the state of the art the positioning of the rotor blades, i.e. their pitch, is normally controlled by an electric pitch system. If one wishes to use a hydraulic pitch system instead a problem arises concerning the transport of the hydraulic or pneumatic fluid to the pitch system. The hydraulic pitch system is positioned at that end of the inside of the hub 7 which faces away from the nacelle 5. The transport of the hydraulic fluid needs to be done by means of transport system supported by a pump providing the pressure within the transport system to feed the pitch system in the hub 7. Due to the movement of the rotor 8 such transport is particularly difficult as normal pipes of the transport system would quickly be twisted due to the rotation movement of the rotor.

FIGS. 2 and 3 show a detailed view of a direct drive wind turbine 1' according to an embodiment of the invention. Again, the wind turbine 1' comprises a rotor 8 and a nacelle 5 to which the rotor 8 is rotatably fixed so that it can be rotated along a rotation axis A. In the wind turbine 1' a hydraulic pitch system 30 is installed which controls the pitch of the rotor blades 10. In FIG. 3 it can be seen that the hydraulic pitch system 30 comprises an accumulator block 2 and three blade blocks 4 which are each connected to one of the rotor blades 10 in order to control their pitch. In the accumulator block 2 the hydraulic fluid is collected and the blade blocks 4 adjust the position of the rotor blades 10 induced by the pressure of the fluid. Directly connected with the accumulator block 2 there is a rotary unit 13 comprising a first (stationary) part 13a and rotatable (non-stationary) part 13b which rotates together with the hub 7 of the rotor 8. The rotary unit 13 will be described in more detail in the context of FIG. 4. In order to feed the rotary unit 13 with hydraulic fluid, in this case oil, a pipe system 11 is led from the nacelle 5 where a pump 15 is situated into the hub 7 to the first part 13a of the rotary unit 30. The pipe system 11 comprises a solid or rigid pipe which is further supported by a rail 6 underneath it. The rail 6 is firmly fixed to the nacelle 5 on an inside surface 12, namely on the bottom floor 12. The rail 6 thus runs along the bottom floor 12 and projects further into the cavity of the inside of the hub 7 of the rotor 8. The rail 6 therefore stabilizes the position of the pipe system 11 and holds the pipe system 11 in position within the hub 7.

As can be seen in FIG. 3 the pipe system 11 comprises a pipe of hollow shape lying upon the rail six and then projecting (cf. FIG. 2) up to the rotation axis A of the hub 7. The rotation axis A of the hub 7 is also the rotation axis B of the rotary unit 13. The pump 15, the pipe 11 supported by the rails 6 and the rotary unit 13 make up a transport system 20 for the hydraulic fluid. This way hydraulic fluid can flow from the pump 15 in the direction of the rotary unit 13 and back while staff can easily walk through the interface region 17 essentially without being hindered by any parts of the transport system 20 projecting into the passage.

FIG. 4 depicts a more detailed side view of the rotary unit 13 with parts of the hydraulic pitch system 30 and parts of the transport system 20. As outlined before, the rotary unit 13 comprises a first stationary part 13a and a second rotatable part 13b which rotates around the rotation axis B. The stationary part 13a is partially inserted into a cavity 16 in the rotatable part 13b and lead along a bearing 24 which also hermetically seals the connection between the first part 13a and the second part 13b. Into the rotary unit 13 there leads a pipe of the pipe system 11 which is supported by the rail 6 as outlined in the context of FIGS. 2 and 3. From where the pipe of the pipe system 11 is connected to the first part 13a of the rotary unit 13 there is a channel 14 inside of the stationary part 13a leading into the direction of the rotatable part 13b. This (first) channel 14 of the first part 13a leads into a second channel 18 in the rotatable part 13b. This second channel 18b leads into the accumulator block 20 where hydraulic fluid is collected and led further into the direction of the blade blocks for adjusting the pitch of the rotor blades 10 (cf. FIGS. 2 and 3). Hydraulic fluid can thus be transported to and fro from the pump 15 (cf. FIGS. 2 and 3) into the hydraulic pitch system 30 and back. Thereby, the rotation of the hub 7 and thus of the rotatable part 13b of the rotary unit 13 does not prevent a safe flow of the fluid from the pump 15 into the pitch system 30 and back.

FIG. 5 shows a second embodiment of a wind turbine 1" according to the invention, again realized as a direct drive wind turbine 1". In contrast to the embodiment shown in FIGS. 2 and 3 no use is made of a rail 6, but rather the transport system 20 is mainly assembled in a ceiling area of the wind turbine 1". The pump 15 is located close to the ceiling 14 of the nacelle 5 and the pipe system 11 is led along the ceiling part 14a of the cavity formed by the generator 22, which cavity ends in the interface region 17 of the wind turbine 1". The pipe system 11 comprises a rigid, solid pipe made of metal which is stable enough to hold itself in position and which describes an essentially linear way from the pump 15 into the hub 7 where it then turns slightly down into the direction of the rotary unit 13 situated diagonally below. An advantage of this embodiment can be seen in the fact that staff are not in danger of even stepping on a part of the transport system 20 so that one is even less hindered during passage of the interface region 17.

It may be understood that the transport system 20 may comprise different elements and/or different outlays of elements, in particular concerning the pipes and the channels 14, 18 as well as the connections between rotatable parts and stationary parts. For instance, the pipe system 11 may also comprise plastic pipes and also (if sufficiently supported in critical regions, particularly the hub) flexible pipes rather than non-flexible, rigid ones.

Although the present invention has been disclosed in the form of preferred embodiments and variations thereon, it will be understood that numerous additional modifications and variations other than those mentioned could be made thereto without departing from the scope of the invention.

For the sake of clarity, it is to be understood that the use of "a" or "an" throughout this application does not exclude a plurality, and "comprising" does not exclude other steps or elements.

LIST OF REFERENCE SIGNS 1, 1', 1" wind turbine
3 tower
4 blade blocks
5 nacelle
6 rail
7 hub
8 rotor
9 openings
10 rotor blades
11 pipe system
12 inside surface—bottom floor
13 rotary unit
13a first (stationary) part
13b second, (rotatable, non-stationary) part
14 ceiling part
14 first channel
14 inside surface—ceiling
15 pump
16 cavity
17 interface region
18 second channel 19 generator rotor
2 accumulator block
20 transport system
21 stator
22 generator
24 bearing
25 bearings
30 hydraulic pitch system
A rotation axis
B rotation axis
$D_1$ division line

The invention claimed is:

1. A direct drive wind turbine, comprising:
a rotor comprising a hub and a plurality of blades,
a nacelle connected to the hub in an interface region;
a transport system for transporting fluid from the nacelle into the hub,
wherein the transport system comprising a rotary unit positioned in the hub at a distance from the interface region in a direction away from the nacelle, a first part of the rotary unit is rotatable together with the hub and a second part of the rotary unit is stationary, the fluid is transported through the rotary unit,
wherein the fluid is hydraulic fluid, pneumatic fluid, or both pneumatic fluid and hydraulic fluid;
wherein the transport system comprises a pipe system leading from the interface region into the hub to the rotary unit,
wherein the pipe system is fixed within the hub such that the pipe is not rotated during operation of the rotary unit; and
wherein the pipe system is fixed within the hub by a rail projecting from the nacelle into the hub.

2. The direct drive wind turbine according to claim 1, wherein the rotary unit is directly connected to a hydraulic pitch system, pneumatic pitch system or both a pneumatic pitch system and a hydraulic pitch system in the hub.

3. The direct drive wind turbine according to claim 1, further comprising
a pump situated in the nacelle, and
wherein the pump in operation provides for pressure of the fluid in the transport system.

4. The direct drive wind turbine according to claim 1, wherein the rail extends from the nacelle to the rotary unit.

5. The direct drive wind turbine according to claim 1, wherein the rail is equipped with a cavity in which a pipe of the pipe system is positioned.

6. The direct drive wind turbine according to claim 1, wherein the rail is fixed to the nacelle such that the interface region the rail is situated close to an inner surface of the wind turbine.

7. The direct drive wind turbine according to claim 1, wherein the rotation axis of the rotary unit is positioned at a rotation axis of a drive train connecting the rotor with a generator.

8. A transport system for transporting a fluid from a nacelle into a hub of a direct drive wind turbine, the direct wind turbine comprising a nacelle and a rotor, the rotor comprising a hub and a plurality of blades, the nacelle connected to the hub in an interface region, the transport system comprising:
a rotary unit configured to be positioned in the hub at a distance from the interface region in a direction away from the nacelle, a first part of the rotary unit is configured to be rotatable together with the hub and a second part of the rotary unit is configured to be stationary, the fluid is transported through the rotary unit, and
wherein the fluid is hydraulic fluid, pneumatic fluid, or both pneumatic fluid and hydraulic fluid;
wherein the transport system comprises a pipe system leading from the interface region into the hub to the rotary unit,
wherein the pipe system is fixed within the hub such that the pipe is not rotated during operation of the rotary unit; and
wherein the pipe system is fixed within the hub by a rail projecting from the nacelle into the hub.

* * * * *